United States Patent [19]

Schmid et al.

[11] Patent Number: 5,474,605
[45] Date of Patent: Dec. 12, 1995

[54] DOUBLY GAS-PHASE PASSIVATED METALLIC PIGMENTS

[75] Inventors: Raimund Schmid, Neustadt; Norbert Mronga, Dossenheim; Harald Keller; Juan A. G. Gomez, both of Ludwigshafen, all of Germany

[73] Assignee: BASF Aktiengesellschaft, Ludwigshafen, Germany

[21] Appl. No.: 425,658

[22] Filed: Apr. 20, 1995

[30] Foreign Application Priority Data

Apr. 22, 1994 [DE] Germany .................. 44 14 079.7

[51] Int. Cl.⁶ ............................................ C09C 1/62
[52] U.S. Cl. .............. 106/404; 106/20 R; 106/403; 427/212; 427/213; 427/214; 427/216; 427/220; 428/402; 428/403; 428/405
[58] Field of Search .................. 106/403, 404, 106/20 R; 428/402, 403, 405; 427/212, 213, 214, 216, 220

[56] References Cited

U.S. PATENT DOCUMENTS

| | | | |
|---|---|---|---|
| 2,885,366 | 5/1959 | Iler | 252/313.2 |
| 3,389,116 | 6/1968 | Saha | 106/403 |
| 4,328,042 | 5/1982 | Ostertag et al. | 106/403 |
| 4,344,987 | 8/1982 | Ostertag et al. | 427/213 |
| 4,622,073 | 11/1986 | Hashizume | 106/403 |
| 5,026,429 | 6/1991 | Mronga et al. | 106/400 |
| 5,261,955 | 11/1993 | Nadkarni | 106/404 |
| 5,352,286 | 10/1994 | Schmid et al. | 106/404 |

FOREIGN PATENT DOCUMENTS

| | | |
|---|---|---|
| 0033457 | 8/1981 | European Pat. Off. . |
| 0045851 | 2/1982 | European Pat. Off. . |

OTHER PUBLICATIONS

Farbe and Lack, vol. 97, pp. 311–314, Apr. 1991, Robert Besold, et al., "Alluminiumpigmente fur Wabrige Beschichtungen—Widerspruch Oder Wirklichkeit".

*Primary Examiner*—Mark L. Bell
*Assistant Examiner*—Scott L. Hertzog
*Attorney, Agent, or Firm*—Oblon, Spivak, McClelland, Maier, & Neustadt

[57] ABSTRACT

Passivated metallic pigments obtainable by gas-phase decomposition of volatile phosphorus compounds and of volatile nitrogenous silicon compounds with steam and/or oxygen in the presence of the agitated pigment particles, and the production of these pigments and their use for coloring water-based printing inks, other inks and paints.

10 Claims, No Drawings

DOUBLY GAS-PHASE PASSIVATED METALLIC PIGMENTS

The present invention relates to novel passivated metallic pigments obtainable by gas-phase decomposition of volatile phosphorus compounds and of volatile nitrogenous silicon compounds with steam and/or oxygen in the presence of the agitated pigment particles.

The invention additionally relates to a process for the production of these pigments and to the use thereof for coloring water-based paints, printing inks and other inks.

For environmental protection reasons, in recent years there has been increasing development of surface-coating systems with a minimum solvent content. The extensive replacement of organic solvents by water has led to great difficulties in the production of paints and printing inks containing metallic pigments.

Metallic pigments such as aluminum flakes are known to undergo an exothermic reaction with water to form aluminum hydroxide and liberate hydrogen. The change in the pigment surfaces, in the extreme case the complete destruction of the pigments, and the reducing properties of the liberated hydrogen, which may lead to chemical changes, eg. in transparent colored pigments which are additionally present in the surface coating, adversely affect the optical properties of the surface coating (eg. gloss, brilliance, hue) to a great extent. In addition, the evolution of hydrogen leads to a considerable pressure of hydrogen inside storage containers and thus to serious hazards when handling them.

However, on the other hand, it is precisely metallic coatings, which confer gloss and a brilliant appearance on the objects provided therewith, which have continuously increased in popularity in the last two decades.

This is why a large number of proposals for solving the problem described above are to be found in particular in the patent literature. Farbe + Lack 97 (1991) 311–314 contains a brief summary.

The conventional processes mentioned therein entail stabilization of the metallic pigments by wet-chemical means.

The passivation of metallic pigments by gas-phase coating (chemical vapor deposition, (CVD) was described for the first time in DE-A-42 36 332, (U. S. Pat. No. 5,352,286). In this case, passivating single-component coatings are applied by hydrolysis in particular of esters of phosphorus acids, phosphorus oxyhalides or vanadium oxyhalides.

Although pigments obtained in particular by the CVD method are very stable (>24 h) in boiling water, they show insufficient stability, like the pigments corresponding to the other prior art, in weakly alkaline aqueous systems as occur in amine-containing water-based paints.

It is an object of the present invention to provide passivated metallic pigments which are stable in particular also in weakly alkaline aqueous systems and are distinguished overall by advantageous use properties.

We have found that this object is achieved by passivated metallic pigments obtainable by gas-phase decomposition of volatile phosphorus compounds and of volatile nitrogenous silicon compounds with steam and/or oxygen in the presence of the agitated pigment particles.

We have also found a process for the production of the passivated metallic pigments by gas-phase coating, which comprises decomposing volatile phosphorus compounds and volatile nitrogenous silicon compounds simultaneously or in any desired sequence successively with steam and/or oxygen in the presence of the agitated pigment particles.

We have also found the use of the passivated metallic pigments for coloring water-based paints, printing inks and other inks.

Suitable substrates for the pigments according to the invention are all metals which are known for metallic effect pigments and are in flake form; eg. besides copper and its alloys such as brass or bronzes, as well as iron and its alloys, particularly suitable are aluminum and its alloys.

Aluminum flakes are of particular interest and are obtained in a straightforward way by punching out of aluminum foil or by conventional atomization or milling techniques. It is possible to use commercial products, and the metal surface must be substantially free of grease or other deposits.

Also suitable as substrates are metallic pigments which are already coated with metal oxide, in particular those based on aluminum. Preferred in this connection are aluminum flakes coated by the CVD method with titanium dioxide and, in particular, with iron oxide (U.S. Pat. No. 5 026 429 and EP-A-33 457), because the passivation can take place immediately after the first coating in the same reactor.

Also suitable are aluminum flakes which are coated with zirconium oxide, silicon oxide or aluminum oxide and which can be produced by wet-chemical coating processes U.S. Pat. No. 5 261 955 and U.S. Pat. No. 2 885 366) or as described in the earlier German Patent Application P 44 05 492.0.

The layers produced therein are essentially composed of silicon and/or aluminum oxide or oxide hydrate by acidic or, preferably, basic hydrolysis of organic silicon and/or aluminum compounds in which the organic radicals are bonded to the metals via oxygen atoms (eg. acetylacetonates or alcoholates, especially $C_1$–$C_4$-alkanolates), in the presence of an organic solvent in which the metal compounds are soluble and which is miscible with water (eg. alcohols, ketones, ethers, carboxamides). In a particularly preferred embodiment of this process, tetraethoxysilane and/or aluminum triisopropanolate are hydrolyzed in the presence of isopropanol and an aqueous ammonia solution as catalyst (and, of course, of the substrate particles), with stepwise heating to reflux.

It is, of course, also possible for the substrate particles to be coated with mixtures of the said oxides.

The size of the substrate particles is not critical and can be made appropriate for the particular purpose of use. As a rule, the flake-like particles have diameters of about 1–200 μm, preferably about 5–100 μm, and a specific surface area (BET) of, normally, 0.5–15 $m^2$/g, preferably 1–7 $m^2$/g.

The metallic pigments according to the invention display a passivation due to two-component coating which is advantageously obtainable according to the process according to the invention by gas-phase decomposition of volatile phosphorus compounds and volatile nitrogenous silicon compounds.

The passivating components can be applied simultaneously or successively. The sequence in the latter case is arbitrary, ie. application can be either initially of the phosphorus-containing component and then of the silicon-containing component or first of the silicon-containing component and then of the phosphorus-containing component.

However, the former variant makes it possible by using functionalized silanes to adjust the pigment surface specifically to meet the requirements of the various surface-coating systems, and it is therefore preferred.

The metallic pigments according to the invention as a rule contain 0.01–10, preferably 0.1–5, % by weight of phosphorus and generally 0.01–10, preferably 0.1–5, % by weight of silicon, in each case based on the completely, ie. doubly, passivated pigments.

Suitable volatile nitrogenous silicon compounds for the coating are, in particular, silanes of the general formula I $R_aSiX_bI$ where R radicals are each $C_1$–$C_{10}$-alkyl which is substituted by a terminal amino, mono($C_1$–$C_{10}$-alkyl)amino or di($C_1$–$C_{10}$-alkyl)amino group, with or without other amino groups, and whose carbon chains can be interrupted by one or more imino groups and can be mono- or polyunsaturated, where the R radicals when a>1 can be identical or different;

X is $C_1$–$C_4$-alkoxy, $C_1$–$C_4$-alkyl, $C_2$–$C_4$-alkenyl or halogen;

a is 1 to 3;

b is 1 to 3, where the total of a+b is 4.

Moreover, particularly suitable silanes of the formula I are those which have a sufficiently high vapor pressure at temperatures below 500° C. to ensure straightforward vaporization.

Preferred silanes I contain at least one R radical substituted by an amino group, and at least one alkoxy radical X.

Particularly preferred silanes have the formula Ia $R'SiX'_3$  Ia where R' is ω-amino-$C_1$–$C_4$-alkyl and X' is methoxy or ethoxy.

Examples of very particularly preferred silanes are $H_2N$—$(CH_2)_3$—$Si(OC_2H_5)_3$ and $H_2N$—$(CH_2)_3$—$Si(OCH_3)_3$.

Examples of other particularly suitable silanes I are: $H_2N$—$(CH_2)_2$—$Si(OC_2H_5)_3$, $H_2N$—$(CH_2)_4$—$Si(OC_2H_5)_3$, $[H_2N$—$(CH_2)_3]_2$, $Si(OC_2H_5)_2$, $H_2N(CH_2)_3$—$Si(OC_2H_5)_2(CH_3)$, $H_2N$—$(CH_2)_3$—$Si(OC_2H_5)_2(CH=CH_2)$, $H_2N$—$CH_2$—$NH$—$CH_2$—$Si(OC_2H_5)_3$ and $H_2N$—$CH_2$—$CH=CH$—$Si(OC_2H_5)_3$.

Particularly suitable volatile phosphorus compounds are, as described in DE-A-42 36 332, which is not a prior publication, those compounds which are formally derived from the oxygen acids of phosphorus.

In this case too, particularly suitable compounds are those which have a pronounced vapor pressure below 500° C. Examples of preferred phosphorus compounds are the tri- and dialkyl (in particular $C_1$–$C_4$-alkyl) esters of phosphoric acid of the formulae $(RO)_3PO$ (R=methyl, ethyl, propyl, isopropyl, butyl or isobutyl) and $(RO)_2(HO)PO$ (R=methyl or ethyl).

The tri- and dialkyl (in particular $C_1$–$C_2$-alkyl) esters of phosphorous acid of the formulae $(RO)_3P$ and $(RO)_2POH$ (R=methyl or ethyl) are particularly preferred.

Also of special interest are phosphorus oxyhalides of the type $POX_3$ where X is identical or different halogen atoms, in particular chlorine and/or bromine atoms. Examples which may be mentioned are $POBr_3$, $POBrCl_2$, $POBr_2Cl$ and, especially, $POCl_3$.

The passivating phosphorus and silicone compounds react in the gaseous state presumably first with the steam or oxygen which is present in the coating to give reactive species which subsequently react with active sites on the pigment particle surface to be protected.

The passivation process according to the invention can advantageously be carried out in a fluidized bed reactor as described, for example, in EP-A-45 581. In this case the pigment particles are initially fluidized with an inert gas, preferably nitrogen, and heated to the reaction temperature of, as a rule, 100°–350° C. (eg. preferably 130°–220° C. for phosphorus oxychloride and preferably 190°–250° C. for 3-aminopropyltriethoxysilane). The vaporized phosphorus and silicone compounds and the steam and/or the oxygen (or air or other oxygen/inert gas mixtures) are then introduced with the aid of an inert carrier gas stream (various part-streams of the fluidizing gas) from upstream vaporizer vessels through separate nozzles.

The concentration of the vaporized passivating species is, based on the total amount of gas in the reactor, expediently ≦3% by volume, preferably 0.001–0.5% by volume.

The amount of steam required depends on the concentration of the passivating compound and should at least correspond to the amount required by the stoichiometry for the hydrolysis, but a 10–100-fold excess is preferred.

Oxygen (or air) is necessary for complete decomposition of the esters of phosphoric acid and of phosphorous acid, and steam can be either present or absent. The amount of oxygen is, based on the total amount of gas in the reactor, advantageously 0.1–5% by volume.

The amount of oxygen required should likewise correspond to at least the amount required by the stoichiometry for the oxidation of carbon, and a 10–100-fold excess is preferred for this.

The two coating components can advantageously be carried out directly, without intermediate isolation of the singly coated substrate, simultaneously or, preferably, successively in the fluidized bed reactor. The latter variant merely requires the vaporizer receiver to be replaced and, where appropriate, the reaction temperature to be controlled.

Normal reaction times for the two coating processes are 1–10 h. The product is then cooled, preferably continuing fluidization with the gas, to room temperature and can then be removed from the reactor.

The passivated metallic pigments can also be subjected to a subsequent polishing step to improve the gloss. The procedure for this can be, for example, to introduce the pigments with approximately 40–60% by weight (based on the amount of pigment) of heavy gasoline into a ball mill charged with stainless steel balls and to agitate the latter on a rolling board for 1–10 h.

The effectiveness of the passivation, ie. in this case the stability of the pigments according to the invention in weakly alkaline aqueous systems, can be rapidly checked by the following boiling test: a suspension of 1.5 g of the test pigment in a solution of 75 ml of butylglycol and 75 ml of a 10% by weight aqueous solution of dimethylethanolamine is refluxed in a closed gas-tight apparatus. The hydrogen produced during this is collected. The time needed for 400 ml of hydrogen to be liberated is measured.

The passivated metallic pigments according to the invention are distinguished by high stability in aqueous systems, especially including weakly alkaline aqueous systems. The boiling times found in the test described above are more than 20 h, usually more than 25 h, while merely phosphated or silanized pigments are stable for only about 1–8 h under the stated conditions.

The pigments according to the invention are suitable for a large number of applications, particular mention being made of the use in aqueous, especially including amine-containing, surface coatings, printing inks and other inks.

EXAMPLES

Production of passivated aluminum pigments according to the invention

EXAMPLE 1 a) A mixture of 250 g of very fine aluminum powder (average particle diameter 20 μm, BET surface area 4.5 m²/g) and 250 g of less fine aluminum powder (average particle diameter 60 μm, BET surface area 1.5 m²/g) was fluidized in a fluidized bed reactor by passing in a total of 1600 l/h nitrogen and was heated to 190° C. In this case one quarter of the fluidizing gases (400 l/h) was passed through a receiver containing phosphorus oxychloride maintained at 40° C., and another quarter of the fluidizing gases was passed through a water receiver maintained at 50° C. In this way, 130 ml of POCl₃ were fed in over the course of 8 h.

b) In a similar way to step a), subsequently 85 ml of 3-aminopropyltriethoxysilane were transferred into the reactor, which was now heated to 220° C., from a vaporizer receiver heated to 110° C. over the course of 8 h.

The resulting passivated aluminum pigment had a phosphorus content of 1.7% by weight and a silicon content of 1.4% by weight.

In the boiling test described above, it took 25.5 h to liberate 400 ml of hydrogen.

For comparison, a sample which had only been phosphated as in step a) was subjected to the boiling test. The pigment decomposed in 1.5 h.

For another comparison, the same aluminum mixture was only silanized as in step b). The resulting pigment had a silicon content of 0.4% by weight and, in the boiling test, decomposed in 8 min.

In an additional comparative test, the same aluminum mixture was phosphated as in step a) and silanized as in step b) but with use of 90 ml of n-propyltriethoxysilane. The pigment obtained in this case decomposed in the boiling test in 10 min.

EXAMPLE 2

In a similar way to Example 1, the same aluminum mixture was passivated, but the sequence of steps a) and b) was changed so that silanization was first and phosphation followed.

The resulting passivated aluminum pigment had a P content of 1.5% by weight and an Si content of 1.4% by weight and was additionally subjected to a polishing step. For this purpose, the pigment was agitated with 50% by weight heavy gasoline in a ball mill charged with stainless steel balls (diameter about 8–10 mm) on a rolling board for 8 h. Subsequently, the useful fraction >32 μm was separated off by screening in test gasoline.

In the boiling test, 400 ml of hydrogen was not evolved until 30 h had elapsed.

EXAMPLE 3

500 g of the aluminum mixture from Example 1 were initially coated with iron oxide to a golden color in a fluidized bed reactor.

For this purpose, the aluminum mixture was fluidized with a total of 1900 l/h nitrogen and heated to 200° C. In this case, 400 l/h of the fluidizing gas was passed through a receiver containing iron pentacarbonyl maintained at room temperature. At the same time, 200 l/h air was blown in through another reactor orifice. In this way, 150 ml of Fe(CO)₅ were decomposed to iron oxide in 10 h.

a) For the subsequent phosphation, the aluminum mixture coated with iron oxide was fluidized with a total of 2000 l/h nitrogen while keeping the temperature at 200° C. 400 l/h of the fluidizing gases were passed through a receiver containing trimethyl phosphite maintained at room temperature. 100 l/h air were admixed to the remaining fluidizing gas. In this way, 50 ml of (CH₃O)₃P were fed in over the course of 5 h.

b) The silanization with 85 ml of 3-aminopropyltriethoxysilane took place as in Example 1.

The resulting passivated aluminum pigment had an Fe content of 7.1% by weight, a P content of 1.9% by weight and an Si content of 0.3% by weight.

In the boiling test, 400 ml of hydrogen were not evolved until 30 h had elapsed.

For comparison, a sample which had only been phosphated as in step a) was subjected to the boiling test. The pigment liberated 400 ml of hydrogen in 10.5 h.

For a further comparison, the same aluminum mixture coated with iron oxide was only silanized as in step b) but with use of 150 ml of 3-aminopropyltriethoxysilane. The resulting pigment had an Si content of 1.3% by weight and, in the boiling test, decomposed in 12 min.

We claim:

1. A passivated metallic pigment obtained by gas-phase decomposition of volatile phosphorus compounds and of volatile nitrogenous silicon compounds with steam and/or oxygen in the presence of the agitated metallic pigment particles.

2. A passivated metallic pigment as claimed in claim 1, in which silanes of the general formula I $$R_aSiX_bI$$ 

where R radicals are each $C_1$–$C_{10}$-alkyl which is substituted by a terminal amino, mono($C_1$–$C_{10}$-alkyl)amino or di($C_1$–$C_{10}$-alkyl) amino group, with or without other amino groups, and whose carbon chains can be interrupted by one or more imino groups and can be mono-or polyunsaturated, where the R radicals when a>1 can be identical or different;

X is $C_1$–$C_4$-alkoxy, $C_1$–$C_4$-alkyl, $C_2$–$C_4$-alkenyl or halogen;

a is 1 to 3;

is 1 to 3, where the total of a+b is 4, have been used as the silicon compounds.

3. A passivated metallic pigment as claimed in claim 1, in which silanes of the general formula Ia $$R'SiX'_3 \text{ Ia}$$ 

where R' is ω-amino-$C_f$–$C_4$-alkyl and X' is methoxy or ethoxy, have been used as the silicon compounds.

4. A passivated metallic pigment as claimed in claim 1, in which tri- or di-$C_1$–$C_4$-alkyl esters of phosphoric acid, tri- or di-$C_1$ –$C_4$-alkyl esters of phosphorous acid or phosphorus oxyhalides have been used as the phosphorus compounds.

5. A passivated metallic pigment as claimed in claim 1, obtained by successive decomposition initially of the phosphorus compounds and subsequently of the silicon compounds.

6. A passivated metallic pigment as claimed in claim 1, in which the pigment particles are selected from the group consisting of aluminum, aluminum alloys, copper, copper alloys, iron or iron alloys.

7. A passivated metallic pigment as claimed in claim 1, in which the pigment particles have already been coated with a first layer of metal oxide.

8. A passivated metallic pigment as claimed in claim 1, in which the pigment particles have already been coated with a first layer selected from the group consisting of titanium oxide, iron oxide, zirconium oxide, silicon oxide and/or aluminum oxide.

9. A process for the production of passivated metallic pigments as claimed in claim 1 by gas-phase passivation, which comprises decomposing volatile phosphorus compounds and volatile nitrogenous silicon compounds simultaneously or in any desired sequence successively with steam and/or oxygen in the presence of the agitated pigment particles.

10. A process for coloring water-based paints, printing inks and other inks which comprises combining the passivated metallic pigment of claim 1 with a paint or ink composition.

* * * * *